United States Patent
Martin et al.

[11] Patent Number: 6,161,680
[45] Date of Patent: Dec. 19, 2000

[54] SPRING CONNECTION FOR VIBRATORY CONVEYOR

[75] Inventors: Larry Martin, Indiana; William Reed, Kitanning, both of Pa.

[73] Assignee: FMC Corporation, Chicago, Ill.

[21] Appl. No.: 09/416,438

[22] Filed: Oct. 12, 1999

[51] Int. Cl.$^7$ ................................................. B65G 27/08
[52] U.S. Cl. ........................................ 198/763; 758/759
[58] Field of Search .................... 198/759, 763, 198/771, 782.1

[56] References Cited

U.S. PATENT DOCUMENTS

| | | | |
|---|---|---|---|
| 2,239,765 | 4/1941 | Wurzbach et al. ...................... | 198/763 |
| 2,664,995 | 1/1954 | Renner . | |
| 2,700,472 | 1/1955 | Carrier, Jr. et al. . | |
| 3,040,891 | 6/1962 | Saxe . | |
| 3,216,556 | 11/1965 | Burgess, Jr. . | |
| 3,348,664 | 10/1967 | Renner ................................ | 198/763 X |
| 3,604,555 | 9/1971 | Cowper . | |
| 3,716,130 | 2/1973 | Morris . | |
| 4,260,052 | 4/1981 | Brown . | |
| 4,313,535 | 2/1982 | Carmichael . | |
| 4,356,911 | 11/1982 | Brown . | |
| 4,378,064 | 3/1983 | Brown . | |
| 4,880,106 | 11/1989 | Falconer et al. . | |
| 5,868,241 | 2/1999 | Pellegrino . | |
| 6,019,216 | 2/2000 | Patterson ............................. | 198/763 X |

OTHER PUBLICATIONS

Key Technology, Inc., "Iso–Flo® "S" Conveyor" (2 pages).
Key Technology, Inc., "Iso–Flo® Smooth–Cycle™ Scale Feed Conveyor" (2 pages).
Key Technology, Inc., "Iso–Flo® Vibratory Conveyors" (2 pages).
FMC Corporation, "The First Name In Food Handling Systems" (18 pages).
FMC Corporation, "FMC Express Limited—Your Destination For Food Handling" 1996 (2 pages).
FMC Corporation, "Syntron VF Vibrating Conveyor" 1994 (4 pages).
FMC Corporation, "Link–Belt® Model BL Vibrating Conveyors" (8 pages).

*Primary Examiner*—James R. Bidwell
*Attorney, Agent, or Firm*—Rockey, Milnamow & Katz, Ltd.

[57] ABSTRACT

A spring connection for a vibratory conveyor having a trough member including a side wall, includes two fasteners which are welded to the side wall. The connection includes a spring connection plate with corresponding fastener holes to receive the fasteners. Nuts are threaded onto the fasteners and torqued down to clamp the connection plate onto the side wall of the trough member. The spring connection plate carries a spring bracket with a mounting hole for connection to one or more springs.

14 Claims, 3 Drawing Sheets

SPRING CONNECTION FOR VIBRATORY CONVEYOR

TECHNICAL FIELD OF THE INVENTION

The present invention relates to vibratory conveyors. Particularly, the invention relates to a system for attaching base mounted springs of a vibratory conveyor to a trough member.

BACKGROUND OF THE INVENTION

Vibratory conveyors are used in many industrial material handling processes to convey bulk process material from one point in the process flow to another. For example, in the snack food industry, vibratory conveyors are used to convey and distribute potato chips, popcorn, corn chips and the like, from the cooking processes to the packaging machines. Such vibratory conveyors are generally of the resonant, two mass design to minimize operating power, and to isolate the generated dynamic operating forces from the support structure of the conveyor and other surrounding equipment.

A resonant, two mass design vibratory conveyor includes a base member that is supported by isolating spring members from a support structure. The spring members adapt the conveyor to the elevation required for the conveyor to be integrated into the material flow path. The base member in turn is connected to a conveying trough member by leaf springs extending between the base and trough members. The longitudinal axis of each of the springs is at a preferred angle to the vertical, imparting a directed force to the material during operation and causing the material to flow along the trough member.

The conveyor also includes a drive mechanism connected between the base and trough members. The drive mechanism acts to cause the base and trough members to vibrate or move back and forth relative to one another. The drive mechanism may be a motor and crank arm system; or an electromagnetic system with the electromagnet core connected to the base member and the electromagnet armature connected to the trough member; or a motor driven rotating eccentric weight exciter mounted to either the base member or the trough member, usually the base member; or some other similar drive system. The natural frequency of the conveyor's mass and spring system is set close to the operating speed of the conveyor to take advantage of the phenomenon of resonance, wherein energy stored in the spring system as it operates is returned to be in phase with the applied driving force. This setting reduces the power required to operate the conveyor to about 25% of what would be required in a direct drive system.

A typical practical conveyor uses several groups or stacks of leaf springs mounted between the base member and the trough member. The groups are spaced-apart along the length of the conveyor. Since the operating forces are applied through these spring groups, large dynamic reversing stresses occur at the spring group attachment points, and therefore the design for the attachment points must be very robust. To be practical from an overall weight, cost, and sanitary design perspective, the trough member is usually constructed of relatively thin stainless steel sheet stock. If the spring groups were mounted directly to the trough member, the side walls would be subjected to excessive vibratory stresses and would soon fail and tear out. Therefore, the spring groups are usually connected to a robust spring mounting bracket strongly welded to a mounting plate that is designed to spread the forces out to acceptably low stress levels along the trough member side wall, to prevent failure. The mounting plate is then typically welded or bolted to the trough member side wall.

Bolting the spring mounting plate to the trough member side wall is a low cost connection, making the design attractive competitively, but it has several drawbacks making it less desirable in operation. The heads of the bolts protrude into the flow of the material in the trough. This may create a sanitary problem. Fine particles can lodge in the crevices around the bolt head and provides a place for bacteria to grow, making it difficult to assure that cleanliness standards are maintained at all times. The heads of the bolts may disrupt smooth material flow in the trough and adversely affect material flow rate. Also, the bolts must be maintained tight to provide the required clamping force to prevent rotating of the bolt head and scoring of the trough interior wall, or even worse, the failure of the connection.

Some manufacturers, such as FMC Corporation's Material Handling Equipment operation, have used a combination cast spring bracket and mounting plate that is inert gas welded to the trough wall. The weld extends around the perimeter of the mounting plate for a secure, low stress, sanitary connection. This method addresses and eliminates the drawbacks of the bolted-on connection, but the design is less attractive competitively. The inert gas welding provides a neat, clean weld finish, but some post weld clean-up is still required, particularly on the interior of the trough wall where the weld heating can discolor the stainless steel side wall material. The trough wall must be buffed and polished to return it to its original condition. Also, the welding heat can cause distortion in the trough member side wall if not carefully applied, requiring straightening of the trough member and further polishing.

The present inventors have recognized that it would be desirable to provide a cost competitive spring connection while maintaining the sanitary and material flow characteristics of the welded mounting plate type spring connection.

SUMMARY OF THE INVENTION

The invention is directed to a vibratory conveyor and an apparatus and method to provide an effective and cost advantageous spring connection for connecting springs to a conveyor trough member, particularly, connecting springs to a relatively thin side wall of the trough member. The spring connection for the vibratory conveyor includes one or more fasteners that is (are) welded to the side wall. The connection includes a spring connection plate with a corresponding fastener hole to receive each fastener. A nut is threaded onto each fastener and torqued down to clamp the connection plate onto the side wall of the trough member. The spring connection plate carries a spring bracket with a mounting hole for connection to one or more springs.

According to the preferred arrangement, the vibratory conveyor includes a base member, a trough member having a side wall, and a plurality of springs, such as leaf springs, extending from the base member to the trough member to support the trough member from the base member. At least one fastener is provided having a head and a threaded shank. The shank penetrates through the side wall, and the head is fixed to the side wall. A connection plate is connected to at least one of the springs, and the shank penetrates the fastener hole of the connection plate. A nut is threaded onto each shank and tightened to fasten the connection plate to the side wall.

Preferably, the head of each fastener is welded all around to an inside surface of the side wall with the shank penetrating the side wall and extending outside the side wall.

Also, the head can have a beveled profile to minimize flow disruption inside the trough. The head can be welded by an inert gas welding technique such as by TIG welding.

Other features and advantages of the present invention shown will become readily apparent from the following detailed description, the accompanying drawings, and the appended claims.

DETAILED DESCRIPTION OF THE PREFERRED EMBODIMENT

Figure 1:
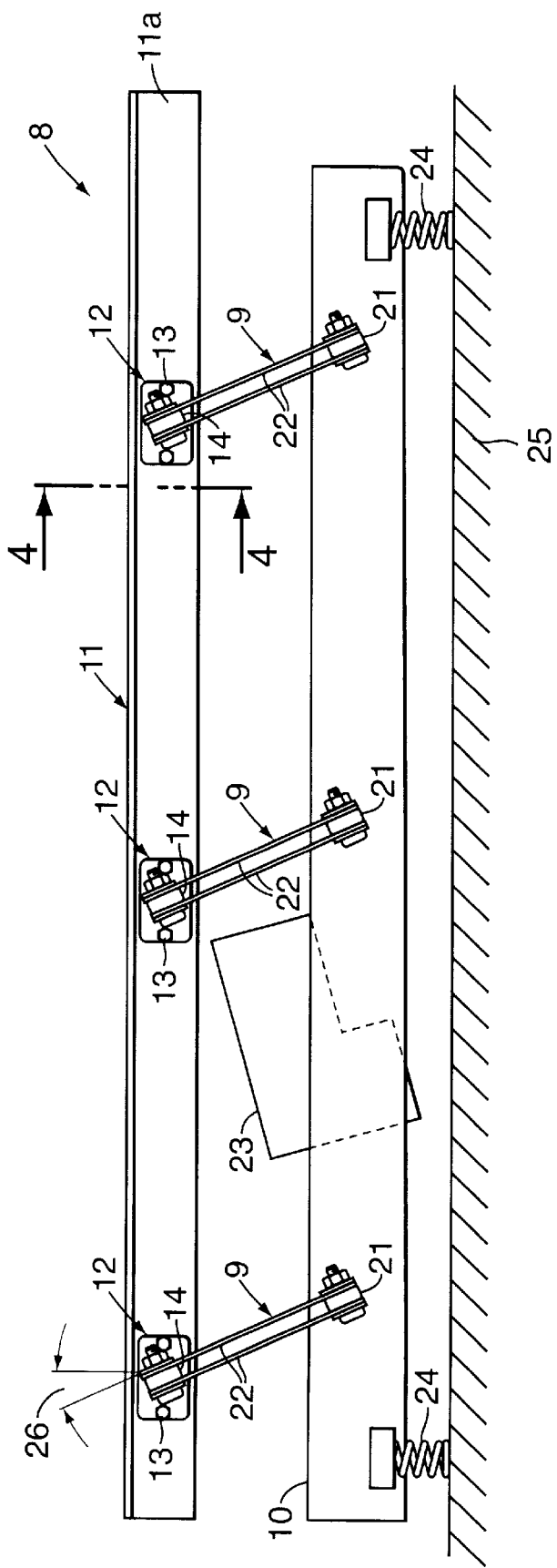
FIG. 1 is an elevational view of a vibratory conveyor that incorporates spring connections of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

FIG. 1, illustrates a vibratory conveyor 8 including a conveying trough member 11 mounted by spring groups or stacks 9 onto a base member 10. The spring groups 9 are each connected to the trough member 11 by a cast spring bracket 14 that is carried on an integral connection plate or mounting plate 12. The mounting plate is bolted to a side wall 11a of the trough member 11 by stud members 18, 18. The mounting plates are spaced at intervals along the length of the conveying trough member 11. Each cast spring bracket 14 is angled at a specific drive angle 26 from the vertical.

The base member 10, comprises two rectangular steel tubes or rectangular plates spaced apart and connected by steel cross members (not illustrated). Base spring mounting blocks 21 are rigidly welded or otherwise connected to the base member 10 at spaced intervals along the length of the base member 10, and angularly align with the cast spring brackets 14. The base spring mounting blocks 21 are also arranged at the specific drive angle 26 from the vertical.

Each spring group 9 includes one or more leaf spring members 22 which are bolted at one end to the cast spring bracket 14 on the trough member 11, and at the opposite end to the base spring mounting block 21. A spring bolt hole 16 formed through the bracket 14 is used to attach the spring members 22. The plurality of spaced-apart groups or stacks 9 of spring members support the trough member 11 above the base member 10.

A drive member 23 is mounted, with the aid of brackets and bolts (not illustrated), to the base member 10 at the specific drive angle 26 from the horizontal, to provide a force perpendicular to the leaf spring's mounting angle 26, when operating. Coil spring isolation members 24 connect the base member to the support structure 25, and absorb the bulk of the dynamic forces generated by the operating conveyor from being transmitted to the support structure 25.

Figure 2:
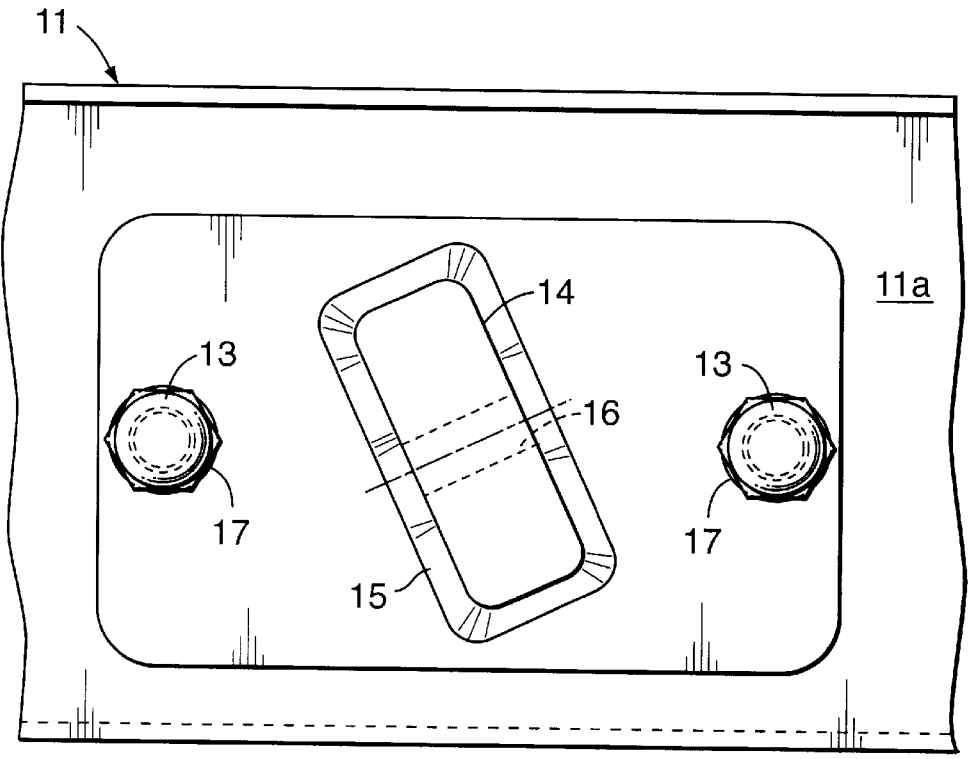
FIG. 2 is an enlarged, fragmentary elevational view of a spring connection taken from FIG. 1, with springs removed for clarity.

Referring to FIG. 2, the cast spring mounting bracket 14 and the mounting plate 12 can be seen in their bolted position on the side wall 11a of the trough member 11. The plate 12 is connected to the side wall 11a by the stud members 18, 18, lock washers 17, 17, and acorn nuts 13, 13. Also noted in this view is the spring bolt hole 16 in the spring mounting bracket 14 and the substantial cast fillet 15 surrounding the base of the spring mounting bracket 14.

Figure 3:
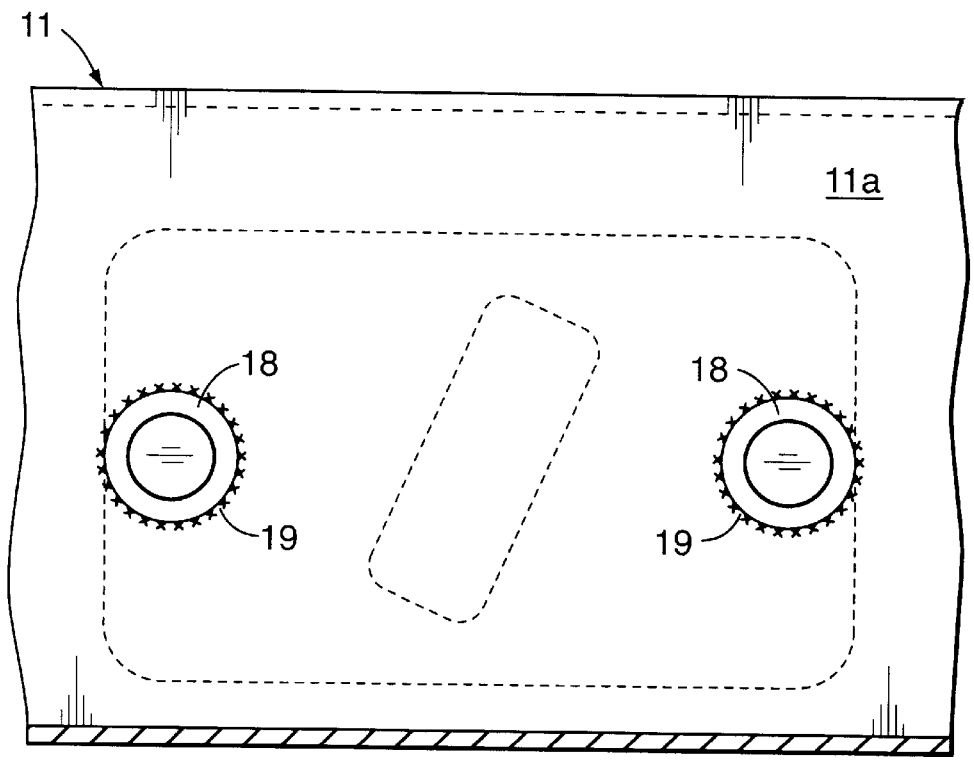
FIG. 3 is a rear view of the spring connection shown in FIG. 2, taken generally along line 3—3 of FIG. 4.

FIG. 3 shows the heads 18a, 18a of the stud members 18, 18 and a continuous inert gas weld bead 19, 19 around each of the entire circumferences of the heads of the stud members 18, 18.

Figure 4:
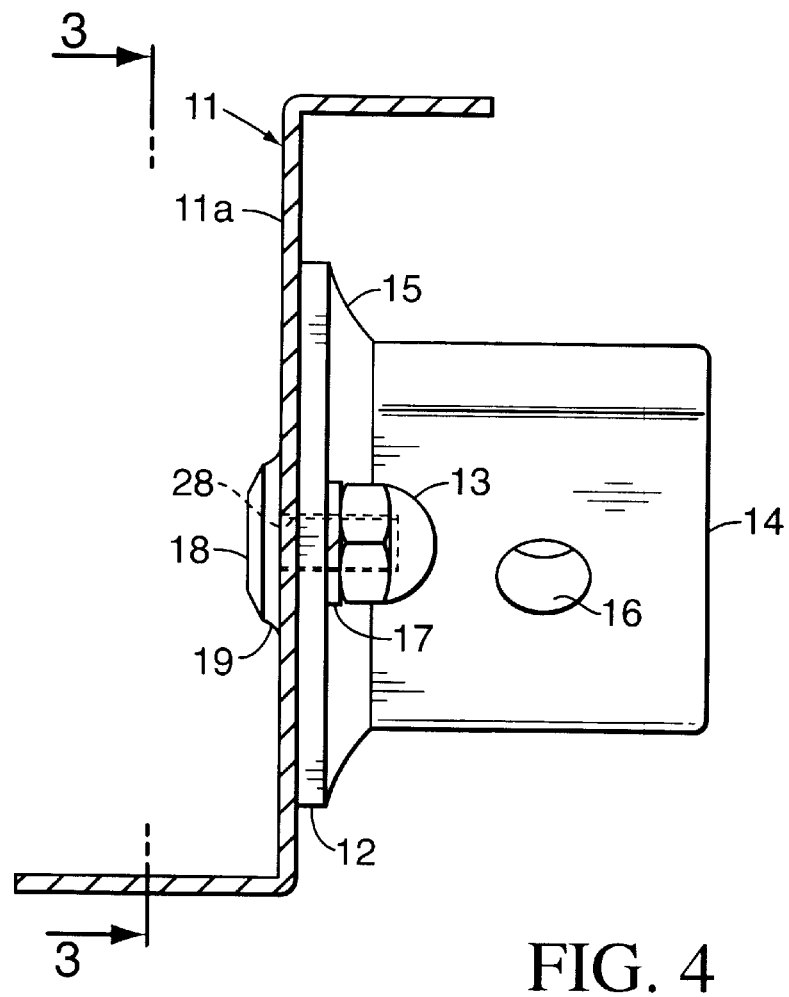
FIG. 4 is an enlarged, fragmentary sectional view taken generally along line 4—4 of FIG. 1, with springs removed for clarity.

FIG. 4 illustrates the cast spring mounting bracket 14 and integral mounting plate 12 bolted on the side wall 11a of the trough member 11, by the stud member 18, the lock washer 17 and acorn nut 13. Also shown is the continuous inert gas weld bead 19, the spring bolt hole 16, the mounting plate 12, locating holes 28 in the side wall of the trough member 11, and the substantial cast fillet 15 surrounding the base of the spring mounting bracket 14.

As shown in FIG. 3 and in FIG. 4, the continuous inert gas weld bead 19 extending around the entire circumference of the head of each of the stud members 18, 18 provides a substantial length of weld to distribute the stress loads generated by the leaf spring members 22 and exerted through the cast spring bracket 14 and the integral mounting plate 12. The weld bead 19 completely seals the joint between the edge of the head of the bolt and the inside surface of the trough side wall 11a to make a sanitary connection free of voids and cracks that might support the growth of harmful bacteria.

The method of the invention therefore includes locating and cutting out the two mounting plate locating holes 28 in the side wall 11a of the trough member 11. The stud members 18, 18 are inserted into the locating holes 28 from the interior side of the trough member 11, such that the heads of the stud members 18, 18 are flush against the interior of the side wall 11a of the trough member 11, protruding into the path of the material flow. The next step is to use an inert gas welding technique, such as TIG welding, to produce a continuous weld bead around the entire circumference of the heads 18a, 18a of the stud members 18, 18. The mounting plate 12 is then placed over the protruding threaded shanks 18b, 18b of the stud member 18, 18 on the exterior side of the trough member 11, and lock washers 17, 17 are placed on the shanks. Acorn nuts 13, 13 are threaded onto the shanks and torqued into place, securely clamping the mounting plate 12 to the exterior of the trough member 11. By using this method of assembly, reversing stresses generated by the vibratory conveyor are spread out to acceptably low levels along the trough side wall.

Figure 5:
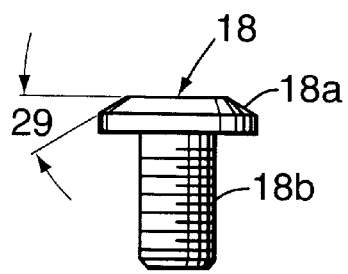
FIG. 5 is an elevational view of a weld stud taken from FIG. 4.

FIG. 5 is a sketch of the custom made stud member 18, showing the head 18a to have an angle of taper 29. The relatively large low profile head has the angle of taper 29 from near the center of the stud to its edge to minimize the disruption of the material bed as it flows past the head 18a. In contrast, the heads of regular bolts protruding into the material flow can produce turbulence around the bolt head slowing the material flow.

From the foregoing, it will observed that numerous modifications and variations can be effected without departing from the spirit and scope of the novel concept of the present invention. It is to be understood that no limitation with respect to the specific embodiments disclosed herein is intended or should be inferred. The disclosure is intended to cover by the appended claims all such modifications as fall within the scope of the claims.

The invention claimed is:

1. A vibratory conveyor, comprising:

a base member;

a trough member having a side wall;

a plurality of springs extending from said base member to said trough member to support said trough member from said base member;

a connector plate connected to one of said springs and having at least one fastener hole; and at least one fastener having a head and a threaded shank, said shank penetrating through said side wall, said head located within said trough member and sealed to said side wall, and said shank penetrating said fastener hole of said connector plate; and at least one nut, said nut threaded onto said shank to fasten said connector plate to said side wall.

2. The conveyor according to claim 1, wherein said head includes a substantially beveled profile within said trough.

3. The conveyor according to claim 1, further comprising a lock washer arranged between said nut and said connector plate.

4. The conveyor according to claim 2, wherein said head is beveled at an angle of taper around a circumference of said head.

5. The conveyor according to claim 1, wherein said springs comprise leaf springs.

6. A method of attaching a leaf spring to a trough member of a vibratory conveyor, comprising the steps of:

providing at least one fastener having a head and a shank;

attaching said fastener to said trough member by fixing said head to said trough member;

providing a connection plate having at least one fastener hole;

inserting said shank through said fastener hole; and providing a nut and tightening said nut onto said shank to attach said connection plate to said trough member, wherein said step of providing said fastener is further defined in that said head has a beveled profile and is located against an inside surface of a side wall said trough member, and said step of fixing said head is further defined in that said head is welded all around to said inside surface of said side wall.

7. The method according to claim 6, wherein said head is beveled at an angle of taper around a circumference of said head.

8. A method of attaching a leaf spring to a trough member of a vibratory conveyor, comprising the steps of:

providing at least one fastener having a head and a shank;

attaching said fastener to said trough member by fixing said head to said trough member;

providing a connection plate having at least one fastener hole;

inserting said shank through said fastener hole; and providing a nut and tightening said nut onto said shank to attach said connection plate to said trough member, wherein said step of fixing said head is further defined in that said head is welded to a side wall of said trough member.

9. The method according to claim 8, wherein said step of fixing said head is further defined in that said head is welded all around to an inside surface of a side wall of said trough member, and said shank penetrates though said side wall.

10. The method according to claim 8, wherein said step of fixing said head is further defined in that said head is welded to a side wall of said trough member by an inert gas welding technique.

11. The method according to claim 8, wherein said step of fixing said head is further defined in that said head is TIG welded to a side wall of said trough member.

12. A vibratory conveyor, comprising:

a base member;

a trough member having a side wall;

a plurality of springs extending from said base member to said trough member to support said trough member from said base member;

a connector plate connected to one of said springs and having at least one fastener hole; and at least one fastener having a head and a threaded shank, said shank penetrating through said side wall, said head fixed to said side wall, and said shank penetrating said fastener hole of said connector plate; and at least one nut, said nut threaded onto said shank to fasten said connector plate to said side wall, wherein said head has a perimeter and is welded all around said perimeter to said side wall.

13. The conveyor according to claim 12, wherein said head is welded all around said perimeter to an inside surface of said side wall.

14. A method of attaching a leaf spring to a trough member of a vibratory conveyor, comprising the steps of:

providing at least one fastener having a head and a shank;

sealing said head to said trough member;

providing a connection plate having at least one fastener hole;

inserting said shank through said fastener hole; and providing a nut and tightening said nut onto said shank to attach said connection plate to said trough member.

* * * * *